United States Patent
Liu et al.

(10) Patent No.: US 9,708,501 B2
(45) Date of Patent: Jul. 18, 2017

(54) POLYMER DISPERSION AND ITS APPLICATION IN HIGH PIGMENT VOLUME CONCENTRATION COATINGS

(71) Applicant: Rohm and Haas Company, Philadelphia, PA (US)

(72) Inventors: Han Liu, Shanghai (CN); Xiangting Dong, Shanghai (CN); Qingwei Zhang, Shanghai (CN); Caifeng Wang, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/129,016

(22) PCT Filed: Apr. 17, 2014

(86) PCT No.: PCT/CN2014/075548
§ 371 (c)(1),
(2) Date: Sep. 26, 2016

(87) PCT Pub. No.: WO2015/157951
PCT Pub. Date: Oct. 22, 2015

(65) Prior Publication Data
US 2017/0101549 A1 Apr. 13, 2017

(51) Int. Cl.
*C09D 143/02* (2006.01)
*C09D 125/14* (2006.01)
*C08L 43/02* (2006.01)
*C08L 23/32* (2006.01)
*C09D 5/02* (2006.01)
*C09D 5/08* (2006.01)
*C08F 212/08* (2006.01)

(52) U.S. Cl.
CPC .......... *C09D 125/14* (2013.01); *C08F 212/08* (2013.01); *C09D 5/02* (2013.01); *C09D 5/08* (2013.01); *C08F 2800/20* (2013.01)

(58) Field of Classification Search
CPC ........ C08F 30/02; C08F 230/02; C08L 43/02; C08L 23/32

USPC ........................................................... 524/547
See application file for complete search history.

(56) References Cited

U.S. PATENT DOCUMENTS

| | | | | |
|---|---|---|---|---|
| 3,449,303 | A * | 6/1969 | Hill | C07F 9/091 524/547 |
| 6,492,451 | B1 * | 12/2002 | Dersch | C03C 17/009 524/430 |
| 7,357,949 | B2 | 4/2008 | Trogolo et al. | |
| 7,459,496 | B2 * | 12/2008 | Hsu | C08F 2/24 524/439 |
| 7,579,081 | B2 | 8/2009 | Brown | |
| 7,893,131 | B2 | 2/2011 | Matthews et al. | |
| 2010/0240822 | A1 | 9/2010 | Trezzi et al. | |
| 2012/0028856 | A1 * | 2/2012 | Adam | C08F 220/06 507/224 |

FOREIGN PATENT DOCUMENTS

| | | |
|---|---|---|
| CN | 101538438 A | 9/2009 |
| WO | 2008135403 A1 | 11/2008 |
| WO | 2010074865 A1 | 7/2010 |

OTHER PUBLICATIONS

Internatonal Search Report for International Application No. PCT/CN2014/075548; International Filing Date Apr. 17, 2014; Date of Mailing Jan. 20, 2015; 4 pages.
Written Opinion of the International Search Report for International Application No. PCT/CN2014/75548; International Filing Date Apr. 17, 2014; Date of Mailing Jan. 20, 2015; 4 pages.

* cited by examiner

*Primary Examiner* — Vu A Nguyen
(74) *Attorney, Agent, or Firm* — Karl E. Stauss; Cantor Colburn LLP

(57) ABSTRACT

The present invention relates to a polymer dispersion of polymer particles comprising phosphorous-containing (meth)acrylate monomers and phosphorus-containing allylic monomers. The present invention further relates to a coating composition made from the polymer dispersion with both satisfactory coating viscosity stability and improved coating performances such as scrub resistance, stain resistance, corrosion resistance and durability.

10 Claims, No Drawings

POLYMER DISPERSION AND ITS APPLICATION IN HIGH PIGMENT VOLUME CONCENTRATION COATINGS

FIELD OF THE INVENTION

The present invention relates to a polymer dispersion. The present invention further relates to a coating composition, especially a high pigment volume concentration (PVC) coating composition, comprising the polymer dispersion.

INTRODUCTION

Benefits of phosphorus-containing monomers such as phosphoethyl methacrylate (PEM) have been long recognized in the coating industry. Coatings, especially high PVC coatings comprising polymer dispersions polymerized from such phosphorus-containing monomers, have dramatically improved coating performances such as scrub resistance, stain resistance, corrosion resistance and durability. However, research has also shown that the content of phosphorus-containing monomers in a coating is inversely correlated to coating viscosity stability.

It is therefore desired in the coating industry to have a phosphorus-containing polymer dispersion that provides a coating composition with both satisfactory coating viscosity stability and improved coating performances like scrub resistance, stain resistance, corrosion resistance and durability.

SUMMARY OF THE INVENTION

The present invention in a first aspect is a polymer dispersion of polymer particles comprising, by dry weight based on total weight of the polymer particles, from 85% to 99.9% of ethylenically unsaturated nonionic monomers, from 0.01% to 4% of phosphorous-containing (meth)acrylate monomers, and from 0.01% to 3% of phosphorus-containing allylic monomers.

In a second aspect, the present invention is a coating composition comprising the said polymer dispersion. The coating composition has both satisfactory coating viscosity stability and improved coating performances such as scrub resistance, stain resistance, corrosion resistance and durability.

DETAILED DESCRIPTION OF THE INVENTION

Polymer Dispersion

The present invention provides a polymer dispersion of polymer particles comprising, by dry weight based on total weight of the polymer particles, (a) from 85% to 99.9%, preferably from 90% to 99%, and more preferably from 92% to 98%, of ethylenically unsaturated nonionic monomers; (b) from 0.01% to 4%, preferably from 0.1% to 3.5%, and more preferably from 0.3% to 2.5%, of phosphorous-containing (meth)acrylate monomers; and (c) from 0.01% to 3%, preferably from 0.1% to 2.5%, and more preferably from 0.3% to 2%, of phosphorous-containing allylic monomers.

Optionally, the polymer dispersion of the present invention further comprises, by dry weight based on total weight of the polymer particles, (d) from 0.01% to 5%, preferably from 0.1% to 3%, and more preferably from 0.3% to 2%, of stabilizer monomers.

As used herein, the term "nonionic monomers" refers to monomers that do not bear an ionic charge between pH=1-14. Examples of suitable ethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, and any combination thereof; (meth)acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); ethylenically unsaturated monomers having a benzene ring such as styrene and substituted styrenes; butadiene; a-olefins such as ethylene, propylene, and 1-decene; vinyl acetate, vinyl butyrate, vinyl versatate and other vinyl esters; vinyl monomers such as vinyl chloride and vinylidene chloride; glycidyl (meth)acrylate; and any combination thereof.

In a preferred embodiment, the ethylenically unsaturated nonionic monomer is selected from styrene, $C_2$-$C_{12}$ alkyl esters of (methyl) acrylic acids, derivatives thereof, and any combination thereof.

Examples of suitable phosphorus-containing (meth)acrylate monomers include phosphoalkyl (meth)acrylates such as phosphoethyl (meth)acrylate, phosphopropyl (meth)acrylate, phosphobutyl (meth)acrylate, salts thereof, and any combination thereof; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and any combination thereof. The phosphorous-containing (meth)acrylate monomers preferably are selected from mono- or di-ester of phosphoalkyl (meth)acrylates, more preferably are mono- or di-ester of phosphoethyl methacrylate, and most preferably are phosphoethyl methacrylate (PEM).

Phosphorus-containing allylic monomer of the present invention has a chemical structure of formula (I):

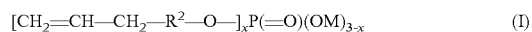

$$[CH_2=CH-CH_2-R^2-O-]_x P(=O)(OM)_{3-x} \quad (I)$$

wherein:

$R^2$ is a linking divalent group, preferably a (poly)oxyalkylene group, x is an average number of from 1 to 2, and M, identical or different, is a hydrogen atom or a cationic counter-ion.

If M is a hydrogen atom, the phosphorus-containing allylic monomer is considered as being in an acid form. If M is a counter-ion, the allylic monomer is considered as being in a salt form or in a neutralized form. M can be, for example, $NH_4^+$, $Na^+$ or $K^+$. The phosphorus-containing allylic monomer can be partially acidic and partially neutralized. Neutralization can occur upon addition of the monomer in the polymerization medium.

The phosphorus-containing allylic monomer can be a mixture of a phosphate mono-ester with x=1, and a phosphate di-ester with x=2. The respective amounts of mono-ester and di-ester are such that x is equal to or higher than 1, for example, equal to or higher than 1.01, and equal to or lower than 2, for example, equal to or lower than 1.99. Preferably, number x can be for example of from 1 to 1.5. X is preferably of from 1 to 1.2, and more preferably of from 1.01 to 1.2. It is mentioned that x=1.2 corresponds to a molar ratio mono-ester/di-ester of 80/20.

Group $R^2$ is a linking divalent group, preferably comprising carbon atoms, and optionally hetero atoms. Examples of groups $R^2$ include divalent alkylene groups with from 2 to 20 carbon atoms and (poly)oxyalkylene groups.

Preferably group $R^2$ is a (poly)oxyalkylene group of formula —[O-A-]$_n$-, wherein:

A, identical or different, is a group of formula —CH$_2$—CH$_2$— or —CH$_2$—CH(CH$_3$)—, or —CH(CH$_3$)—CH$_2$—, and n is an average number of at least 1.

Groups —O-A- wherein A is —CH$_2$—CH$_2$— correspond to ethoxy groups that can be obtained from ethylene oxide. Groups —O-A- wherein A is —CH$_2$—CH(CH$_3$)— or —CH(CH$_3$)—CH$_2$— correspond to propoxy groups that can be obtained from propylene oxide. (Poly)oxyalkylene groups of formula —[O-A-]$_n$- can comprise both ethoxy groups and propoxy groups, arranged randomly or by blocks.

Preferably $R^2$ is a polyoxyethylene group of formula —[O—CH$_2$—CH$_2$]$_n$—, wherein n is an average number of from 2 to 10, preferably of from 2.5 to 7.

Examples of the phosphorus-containing allylic monomers with formula (I) include SIPOMER™ COPS-3 and SIPOMER PAM-5000 both commercially available from Solvay Company.

Examples of the stabilizer monomers include sodium styrene sulfonate (SSS), sodium vinyl sulfonate (SVS), 2-acrylamido-2-methylpropanesulfonic acid (AMPS), acrylamide (AM), acrylic acid (AA), methylacrylic acid (MAA), itaconic acid (IA), and any combination thereof.

The polymerization of the polymer particles can be any method known in the art, including emulsion polymerization, mini-emulsion polymerization, and mechanical dispersing technology. Suitable examples of polymerization process include those disclosed in U.S. Pat. Nos. 7,579,081 B2, 7,357,949 B2 and WO 2010074865 A1.

Coating Composition

The polymer dispersion of the present invention can be made into a coating composition by addition of pigments, extenders, and additives.

Pigments of the present invention are typically inorganic pigment particles, and preferably particulate inorganic materials which are capable of materially contributing to the opacity or hiding capability of a coating. Such materials typically have a refractive index of equal to or greater than 1.8 and include titanium dioxide (TiO$_2$), zinc oxide, zinc sulfide, barium sulfate, and barium carbonate. Titanium dioxide (TiO$_2$) is preferred.

Extenders are typically a particulate inorganic materials having a refractive index of less than or equal to 1.8 and greater than 1.3 and include calcium carbonate, clay, calcium sulfate, aluminosilicate, silicate, zeolite, mica, diatomaceous earth, solid or hollow glass, and ceramic bead.

The coating composition of the present invention may further contain at least one conventional coating additives such as coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, colorants, flowing agents, crosslinkers, and anti-oxidants. The uses of these additives are known in the art.

PVC (pigment volume concentration) of a coating is calculated as follows,

PVC (%)=[volume of pigment(s)+volume of extender(s)]/total dry volume of coating.

In a preferred embodiment, the coating PVC is higher than 70%, preferably higher than 75%, and more preferably higher than 85%.

Preparation of the Coating Composition

The preparation of the coating composition involves the process of selecting and admixing appropriate coating ingredients in the correct proportions to provide a coating with specific processing and handling properties, as well as a final dry coating film with the desired properties.

Application of the Coating Composition

The coating composition may be applied by conventional application methods such as brushing, roller application, and spraying methods such as air-atomized spray, air-assisted spray, airless spray, high volume low pressure spray, and air-assisted airless spray.

Suitable substrates for coating application include concrete, cement board, medium-density fiberboard (MDF) and particle board, gypsum board, wood, stone, metal, plastics, wall paper and textile, etc. Preferably, all the substrates are pre-primed by waterborne or solvent-borne primers.

EXAMPLES

Some embodiments of the invention are described in the following Examples, wherein all parts and percentages are by weight unless otherwise specified.

RHODAFAC™ RS-610A25 surfactant and SIPOMER™ COPS-3 stabilizer are available from Solvay Company.

DISPONIL™ FES 32 anionic surfactant is available from Cognis Company.

Phosphoethyl methylacrylate ("PEM") is available from The Dow Chemical Company.

Butyl acrylate ("BA"), styrene ("ST"), and acrylic acid ("AA") are all available from Shanghai LangYuan Chemical Co., Ltd.

SILQUEST™ A-171 silane ("A-171") is vinyltrimethoxysilane and is available from Momentive Company.

Sodium persulphate ("SPS"), sodium hydroxide ("NaOH"), hexametaphosphate ("SHMP"), ammonia and sodium styrene sulfonate ("SSS") are all available from Shanghai Chemical Reagent Co. Ltd.

Propylene glycol and ethylene glycol are used as co-solvents and are available from Shanghai Chemical Reagent Co. Ltd.

Hydroxy ethyl cellulose ("HEC") is used as a thickener and is available from Shanghai Chemical Reagent Co. Ltd.

AMP-95™ neutralizer is 2-methyl-2-amino propanol and is available from The Dow Chemical Company.

OROTAN™ 1288 dispersant is a polyacid and is available from The Dow Chemical Company.

DISPELAIR™ CF-246 defoamer is available from Blackburn Chemicals.

DB-80 extender is calcined kaolin, available from Jinyang Gaoling Ltd. Co. (China).

ASP-170 extender is washed kaolin, available from Engelhard.

TI-PURE™ R-706 pigment is titanium dioxide, available from DuPont.

TALC-800 extender is talcum powder, available from Meijia Chemical Company.

CC-700 extender is calcium carbonate, available from Guangfu Building Materials Group (China).

TEXANOL™ coalescent is 2,2,4-trimethyl-1,3-pentanediolmono(2-methylpropanoate), available from Eastman.

KATHON™ LX biocide is a mixture of 5-chloro-2-methyl-4-isothiazolin-3-one and 2-methyl-4-isothiazolin-3-one, available from DOW Chemical Company.

The following standard analytical equipment and methods are used in the Examples.

Volume Solids Content

The volume solids content of a coating composition is calculated as follows. The total volume of pigments and extenders in the coating composition is denoted as $V_p$. The total volume of non-volatile solids except pigments and extenders in the coating composition (also known as "volume of solid binder") is denoted as $V_b$. The total volume of the coating composition (also known as "total wet coating volume") is denoted as $V_w$. The volume solids content of the coating composition is measured according to the following equation:

Volume solids=$[(V_p+V_b)/V_w]\times 100\%$

Heat-age Stability

A Stormer viscometer is used to test the viscosity of a coating composition according to the ASTM (American Society for Testing and Materials) D562 method. After the coating composition is formed, an initial medium shear viscosity, Initial KU, of the coating composition is tested at room temperature, then the coating composition is balanced at room temperature overnight. Then, the viscosity of the coating composition is measured and recoded as Overnight KU. The coating composition is then placed in an oven at 50° C. for 10 days. The viscosity of the coating composition after storage is tested and recorded as Final KU. The difference between Initial KU and Final KU is defined as the viscosity change, ΔKU. The smaller the ΔKU value, the better the heat-age stability will be. ΔKU between -5 KU and 10 KU is acceptable.

Scrub Test

Scrub Test (also known as "Washability") of coatings is determined using a modified version of the ASTM D 2486-74A method. Compared to the ASTM D 2486-74A method, there is one modification in the test method used herein, that is, the scrub medium used is a 0.5% by weight household detergent solution.

Preparation of Polymer Dispersion A (Binder A)

A monomer emulsion was prepared by combining 636.42 grams (g) of BA, 702.54 g of ST, 27.98 g of AA, 6.93 g of PEM, 4.28 g of A-171, 331.58 g of DI Water, and 56.76 g of a 31.0% by weight aqueous solution of DISPONIL FES 32, and emulsified with stirring. Then, 10.27 g of a 31% by weight aqueous solution of DISPONIL FES 32 and 622.50 g of DI water were charged to a five liter multi-neck flask fitted with mechanical stirring. The materials in the flask were heated to 90° C. under a nitrogen atmosphere. To the stirred flask, 34.65 g COPS-3 was first added into the vessel. 45.6 g of the monomer emulsion obtained above were added followed by 4.95 g of SPS in 24.90 g of DI water. The remaining monomer emulsion and a solution of 2.83 g of APS in 172.09 g of DI water were then added to the flask over 120 minutes while the reactor temperature was maintained at 88° C. Then, 26.56 g of DI water was used to rinse the emulsion feed line to the reactor. The reaction mixture was then cooled down to room temperature. During cooling the reaction mixture, 0.013 g of ferrous sulfate and 0.013 g of EDTA, 4.88 g of t-butyl hydroperoxide (70%) and 2.33 g of isoascorbic acid in aqueous solutions were added into the flask. The obtained dispersion was neutralized to a pH of 7.5 to 8.5 with ammonia.

Preparation of Polymer Dispersions B-H (Binders B-H)

Polymer dispersions B-H were prepared according to the same procedure as described above for preparing the Polymer Dispersion A, wherein the monomer compositions were prepared based on formulations described in Table 1. Polymer dispersions F and G further comprises, respectively, based on the weight of total monomers, 2.22% RHODAFAC RS-610A25 and 0.22% SHMP, as unpolymerizable phosphorous-containing components.

TABLE 1

| (%)* | Binders | | | | | | | |
|---|---|---|---|---|---|---|---|---|
| | A | B | C | D | E | F | G | H |
| PEM | 0.50 | 2.3 | 3.50 | 0.25 | 2.30 | 2.30 | 2.30 | 0 |
| AA | 2.00 | 2.00 | 1.70 | 2.00 | 1.00 | 1.00 | 1.00 | 1.00 |
| COPS-3 | 1.00 | 1.50 | 0.50 | 0 | 0 | 0 | 0 | 1.00 |
| SSS | 0 | 0 | 0 | 0.33 | 0 | 0 | 0 | 0 |
| A-171 | 0.30 | 0.30 | 0.30 | 0.30 | 0.30 | 0.30 | 0.30 | 0.30 |
| BA | 45.70 | 45.70 | 45.70 | 42.10 | 42.10 | 42.10 | 42.10 | 45.70 |
| ST | 50.50 | 48.20 | 48.30 | 55.02 | 54.30 | 54.30 | 54.30 | 52.00 |
| RHODAFAC RS-610A25 | 0 | 0 | 0 | 0 | 0 | 1 | 0 | 0 |
| SHMP | 0 | 0 | 0 | 0 | 0 | 0 | 0.5 | 0 |

*% weight percent based on the weight of total monomers; monomers are PEM, AA, COPS-3, SSS, A-171, BA, and ST if present.

Comparative Example (Comp Ex) A

Comp Ex A was a coating composition prepared based on formulations described in Table 2. Ingredients of the grind were mixed using a high speed Cowles disperser. Binder D (480 g) was added into the grind. Then, 60 g of TEXANOL (21.7% by weight relative to the binder's solids) was added into the resultant mixture. DISPELAIR CF-246 (12 g) and DI water (1176.60 g) were further added to the mixture and mixed for 30 minutes using a conventional lab mixer. The resultant aqueous coating composition of Comp Ex A had 83.84% PVC and 31.66% volume solids ("VS").

TABLE 2

| Coating compositions (g) | | |
|---|---|---|
| Grind | | |
| Water | | 1200 |
| solvent | propylene glycol | 15.00 |
| solvent | ethylene glycol | 15.00 |
| thickener | HEC | 36.00 |
| neutralizer | AMP-95 | 6.00 |

TABLE 2-continued

| Coating compositions (g) | | |
|---|---|---|
| dispersant | OROTAN 1288 | 22.80 |
| defoamer | DISPELAIR CF-246 | 6.00 |
| extender | DB-80 | 360.00 |
| extender | ASP-170 | 354.00 |
| pigment | TI-PURE R-706 | 177.60 |
| extender | TALC-800 | 450.00 |
| extender | CC-700 | 1620.00 |
| biocide | KATHON LX | 9.00 |
| Grind Sub-total | | 4271.40 |
| LetDown | | |
| Binder D | | 480.00 |
| coalescent | TEXANOL | 50.00 |
| defoamer | DISPELAIR CF-246 | 12.00 |
| Water | | 1186.60 |
| Total | | 6000.00 |

Examples (Exs) 1-3 and Comparative Examples (Comp Exs) B-D

Coating compositions of Exs 1-3 and Comp Exs B-D were prepared according to the same procedure for Comp Ex A, except that the binder types were different. Different binder types for these coating compositions were described in Table 3. The coalescent dosage was different, but the coalescent concentration was kept 21.7% based on binder solids. When preparing the coating compositions with different binder dosage and coalescent concentration, water dosage was modified accordingly to make the total weight of the coating composition equal to 6000 g, respectively.

TABLE 3

| | Exs/Comp Exs | | | | | | | |
|---|---|---|---|---|---|---|---|---|
| | A | 1 | 2 | 3 | B | C | D | E |
| | Binders* | | | | | | | |
| | D | A | B | C | E | F | G | H |
| PEM | 0.25 | 0.5 | 2.3 | 3.5 | 2.3 | 2.3 | 2.3 | 0 |
| COPS-3 | 0 | 1 | 1.5 | 0.5 | 0 | 0 | 0 | 1 |
| RHODAFAC RS-610A25 | 0 | 0 | 0 | 0 | 0 | 1 | 0 | 0 |
| SHMP | 0 | 0 | 0 | 0 | 0 | 0 | 0.5 | 0 |
| Initial KU | 124.5 | 100.4 | 101.0 | 100.5 | 102.3 | 102.7 | 101.8 | 105.0 |
| Overnight KU | 126.3 | 102.1 | 105.0 | 107.1 | 110.6 | 110.3 | 107.4 | 106.2 |
| Final KU | 115.0 | 104.9 | 110.0 | 114.6 | >140 | >140 | >140 | 96.5 |
| ΔKU | −9.5 | 4.5 | 9.0 | 4.1 | >37 | >37 | >38 | −8.5 |
| Washability | 48% | 168% | 237% | 141% | 114% | 128% | 97% | 109% |

*each monomer in the binder is by weight percent based on the weight of total monomers; monomers are PEM, AA, COPS-3, SSS, A-171, BA, and ST if present.

As shown in Table 3, coating compositions of Comp Ex A and Comp Ex B both comprised in the polymer particles of their polymer dispersions, the phosphorous-containing (meth)acrylate monomer, as presented by PEM of different contents. Neither of them comprised the phosphorous-containing allylic monomer, presented by COPS-3. Comp Ex B, compared to Comp Ex A, had a higher PEM content (2.3% compared to 0.25%), and a better washability (114% compared to 48%). However, without the addition of the phosphorous-containing allylic monomer, Comp Ex B had a very poor heat-age stability (ΔKU>37, which is unacceptable) to achieve the better washability.

Coating compositions of Ex 2 and Comp Ex B had the same PEM contents, while Ex 2 additionally comprised the phosphorous-containing allylic monomer, the COPS-3 monomer. The heat-age stability of Ex 2 was improved significantly (from unacceptable to acceptable) compared to that of Comp Ex B. Meanwhile, the washability of Ex B was even improved compared to that of Comp Ex B (from 114% to 237%). It suggested the possibility that the addition of the phosphorus-containing allylic monomer contributed both to the heat-age stability and the washability.

Coating compositions of Ex1 and Comp EX E had equal COPS-3 contents, while Ex 1 comprised additional PEM. The washability of Ex 1 and Comp E were both acceptable while that of Ex 1 was even improved. However, the heat-age stability of Comp E was much poorer than that Ex 1 and was not acceptable. It suggested that COPS-3 alone, without the addition of the phosphorous-containing (meth)acrylate monomer, would not achieve acceptable heat-age stability.

Coating compositions of Exs 1, 2, and 3 comprised both the phosphorous-containing (meth)acrylate monomer, the PEM monomer, and the phosphorus-containing allylic monomer, the COPS-3 monomer, of different contents. All of these coating compositions had both acceptable washability and heat-age stability.

Notably, the phosphorous-containing (meth)acrylate monomer, presented by the PEM monomer, and the phosphorus-containing allylic monomer, presented by the COPS-3 monomer had to work together and in a balanced content level to achieve best performances in both heat-age stability and washability.

As shown also in Table 3, the coating compositions of Comp Exs C and D comprised unpolymerizable phosphorus-containing components, RHODAFAC RS-610A25 and SHMP, respectively. For clarification, these components differed from the phosphorus-containing monomers of the present invention, the phosphorus-containing (meth)acrylate monomers and the phosphorus-containing allylic monomers, in that these components are not polymerizable. The data suggested that if not polymerized, the phosphorus-containing components would not play the role of improving the heat-age stability.

What is claimed is:

1. A polymer dispersion of polymer particles comprising, by dry weight based on total weight of the polymer particles, from 85% to 99.9% of ethylenically unsaturated nonionic monomers; from 0.01% to 4% of phosphorous-containing (meth)acrylate monomers; and from 0.01% to 3% of phosphorus-containing allylic monomers.

2. The polymer dispersion according to claim 1 further comprising, by dry weight based on total weight of the polymer particles, from 0.01% to 5% of stabilizer monomers.

3. The polymer dispersion according to claim 1 wherein the ethylenically unsaturated nonionic monomers are selected from alkyl esters of (methyl) acrylic acids, (meth) acrylonitrile, (meth)acrylamide, amino-functional and ureido-functional monomers, monomers bearing acetoacetate-functional groups, monomers bearing carbonyl-containing groups, ethylenically unsaturated monomers having a benzene ring, butadiene, α-olefins, vinyl esters, vinyl monomers, glycidyl (meth)acrylate, or any combination thereof.

4. The polymer dispersion according to claim 3 wherein the ethylenically unsaturated nonionic monomers are selected from styrene, $C_2$-$C_{12}$ alkyl esters of (methyl) acrylic acids, or any combination thereof.

5. The polymer dispersion according to claim 1 wherein the phosphorus-containing (meth)acrylate monomers are selected from phosphoalkyl (meth)acrylates and salts thereof, phosphoalkoxy (meth)acrylates and salts thereof, or any combination thereof.

6. The polymer dispersion according to claim 5 wherein the phosphorus-containing (meth)acrylate monomers are mono- or di-ester of phosphoethyl methacrylates.

7. The polymer dispersion according to claim 1 wherein the phosphorus-containing allylic monomer has a chemical structure of formula (I):

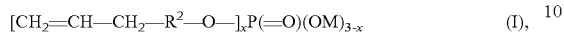

$$[CH_2\!\!=\!\!CH\!\!-\!\!CH_2\!\!-\!\!R^2\!\!-\!\!O\!\!-\!\!]_x P(\!\!=\!\!O)(OM)_{3-x} \qquad (I),$$

wherein $R^2$ is a linking divalent group, x is an average number of from 1 to 2, and M, identical or different, is a hydrogen atom or a cationic counter-ion.

8. The polymer dispersion according to claim 7 wherein x is from 1 to 1.5.

9. The polymer dispersion according to claim 7 wherein $R^2$ is a (poly)oxyalkylene group of formula $-\![O\text{-}A\text{-}]_n\text{-}$, wherein:

A, identical or different, is a group of formula $-\!CH_2\!-\!CH_2\!-$ or $-\!CH_2\!-\!CH(CH_3)\!-$, or $-\!CH(CH_3)\!-\!CH_2\!-$, and n is an average number of at least 1.

10. A coating composition comprising the polymer dispersion according to claim 1.

* * * * *